(No Model.)

7 Sheets—Sheet 1.

J. F. CARTER.
ORE ROASTING FURNACE.

No. 311,058. Patented Jan. 20, 1885.

WITNESSES:
James F. Tobin
John M. Clayton.

INVENTOR:
John F. Carter
by his Attorneys
Howson & Sons (No Model.) 7 Sheets—Sheet 2.
J. F. CARTER.
ORE ROASTING FURNACE.

No. 311,058. Patented Jan. 20, 1885.

WITNESSES:
James F. Tobin
John M. Clayton

INVENTOR:
John F. Carter
by his Attorneys
Howson & Sons (No Model.) 7 Sheets—Sheet 3.
J. F. CARTER.
ORE ROASTING FURNACE.
No. 311,058. Patented Jan. 20, 1885.
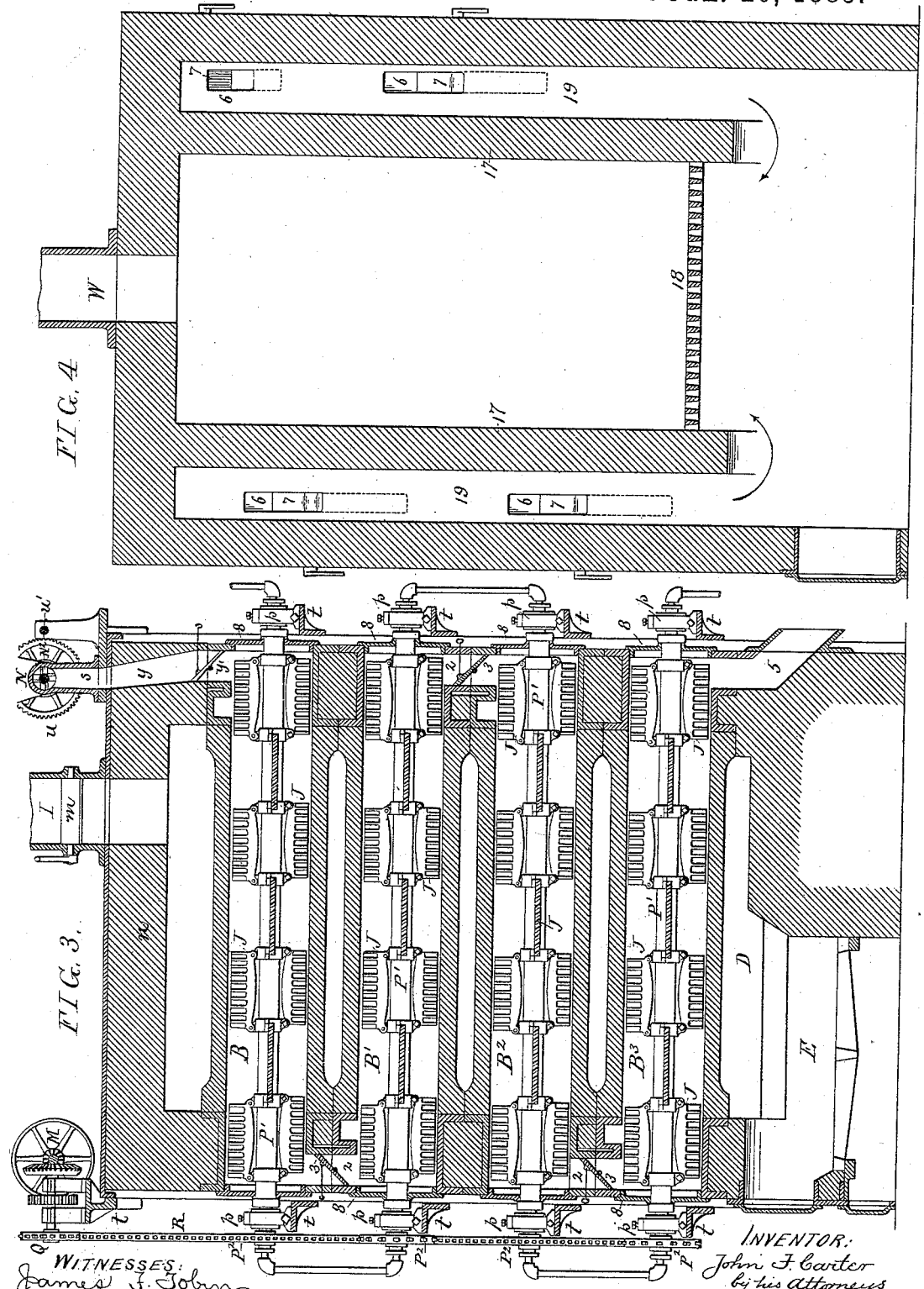
WITNESSES:
James F. Tobin
John M. Clayton
INVENTOR:
John F. Carter
by his Attorneys
Howson & Sons (No Model.)　　　　　　　　　　　　　　　　　7 Sheets—Sheet 4.
J. F. CARTER.
ORE ROASTING FURNACE.
No. 311,058.　　　　　　　　　　Patented Jan. 20, 1885.
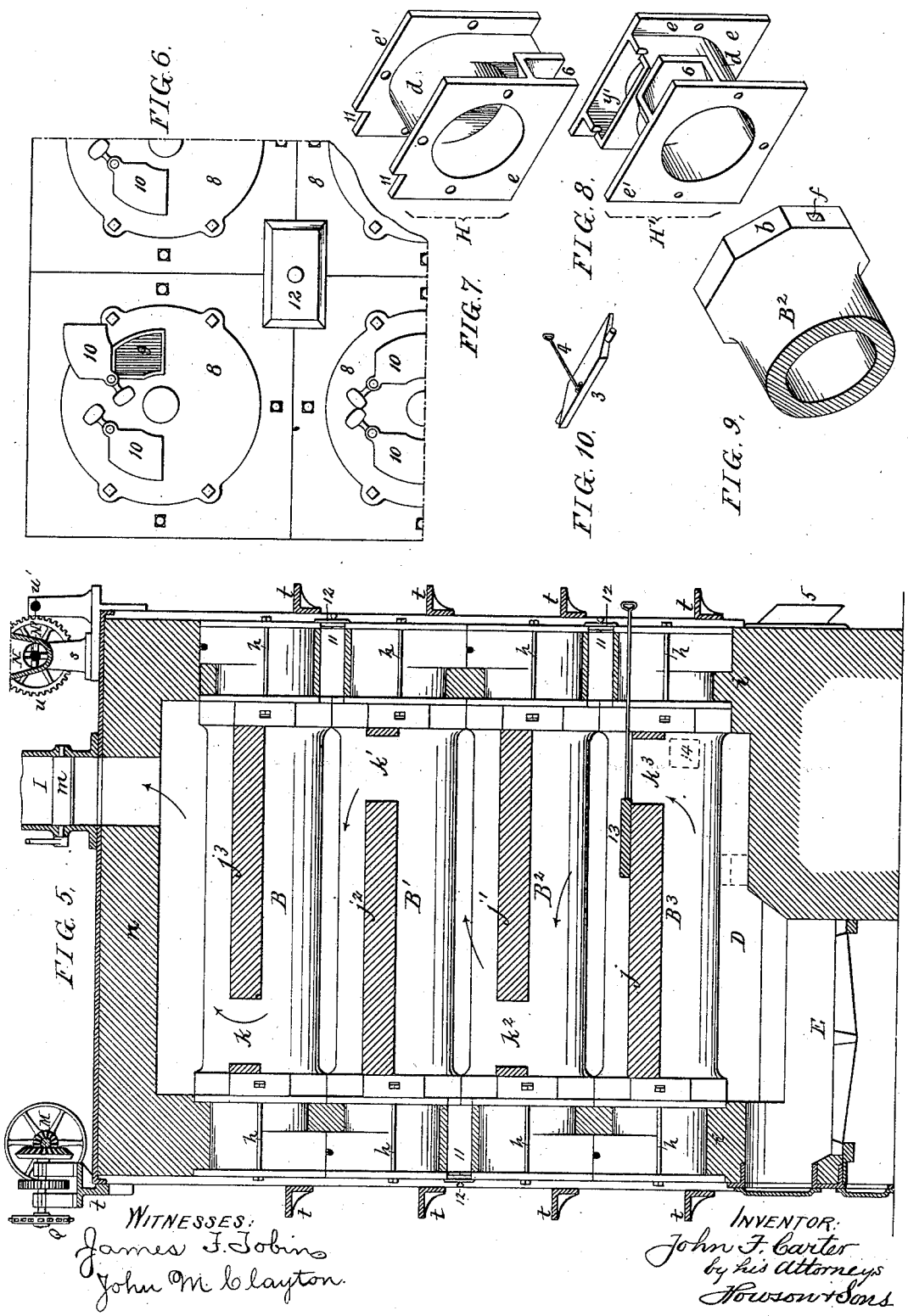

(No Model.)

J. F. CARTER.
ORE ROASTING FURNACE.

No. 311,058. Patented Jan. 20, 1885.

WITNESSES:
James J. Tobin
John M. Clayton

INVENTOR:
John F. Carter
by his Attorneys
Howson & Sons (No Model.) 7 Sheets—Sheet 6.
J. F. CARTER.
ORE ROASTING FURNACE.

No. 311,058. Patented Jan. 20, 1885.

WITNESSES:
James J. Tobin
John M. Clayton

INVENTOR:
John F. Carter
by his Attorneys
Howson & Sons

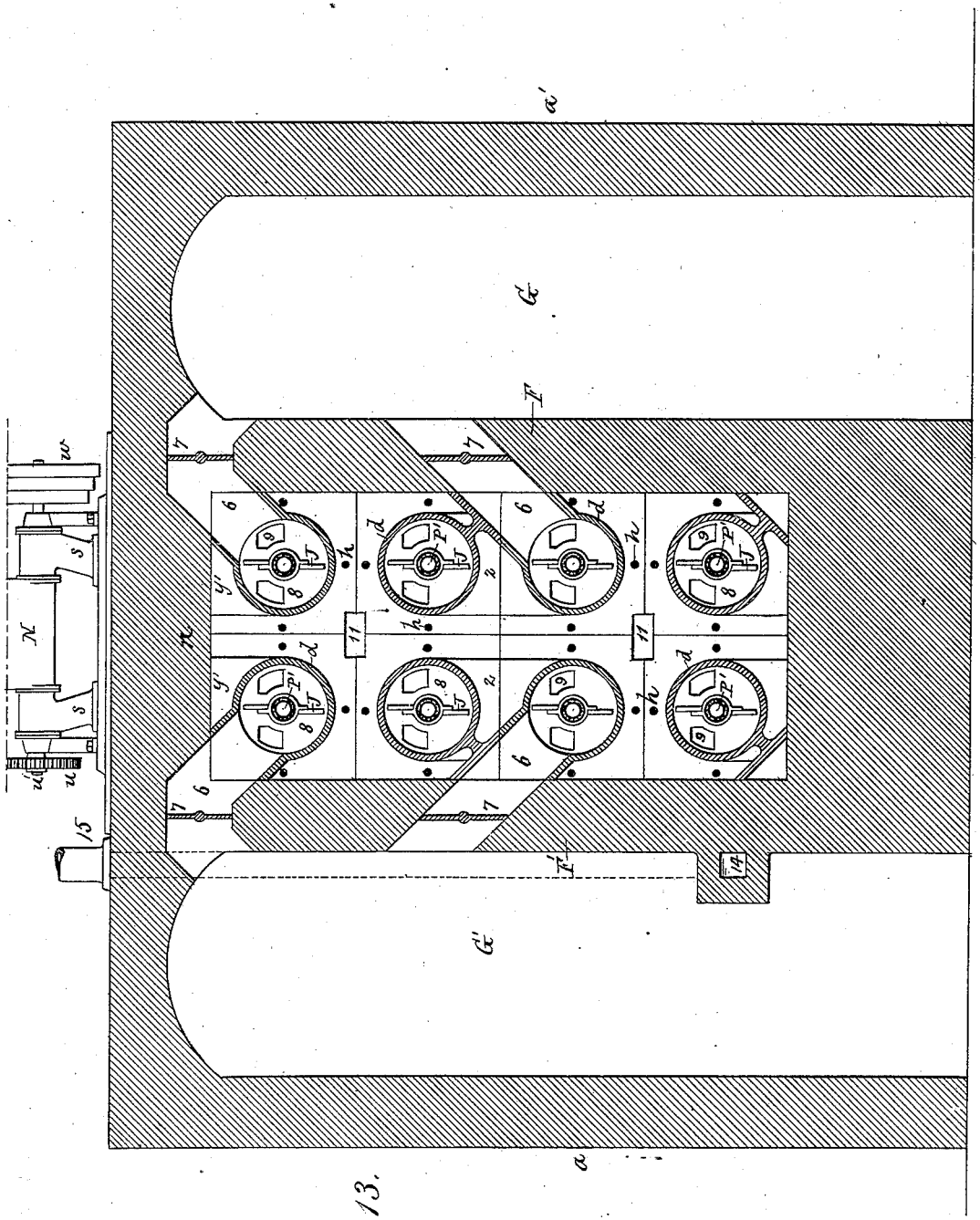

UNITED STATES PATENT OFFICE.

JOHN F. CARTER, OF PHILADELPHIA, PENNSYLVANIA, ASSIGNOR TO WILLIAM McGEORGE, JR., OF SAME PLACE.

ORE-ROASTING FURNACE.

SPECIFICATION forming part of Letters Patent No. 311,058, dated January 20, 1885.

Application filed May 16, 1884. (No model.)

*To all whom it may concern:*

Be it known that I, JOHN F. CARTER, a citizen of the United States, residing in Philadelphia, Pennsylvania, have invented certain Improvements in Ore-Roasting Furnaces, of which the following is a specification.

My invention consists of certain improvements, fully described and claimed hereinafter, in the ore-roasting furnace for which Letters Patent No. 280,102 were granted to T. Walker and myself June 26, 1883.

Figure 1:
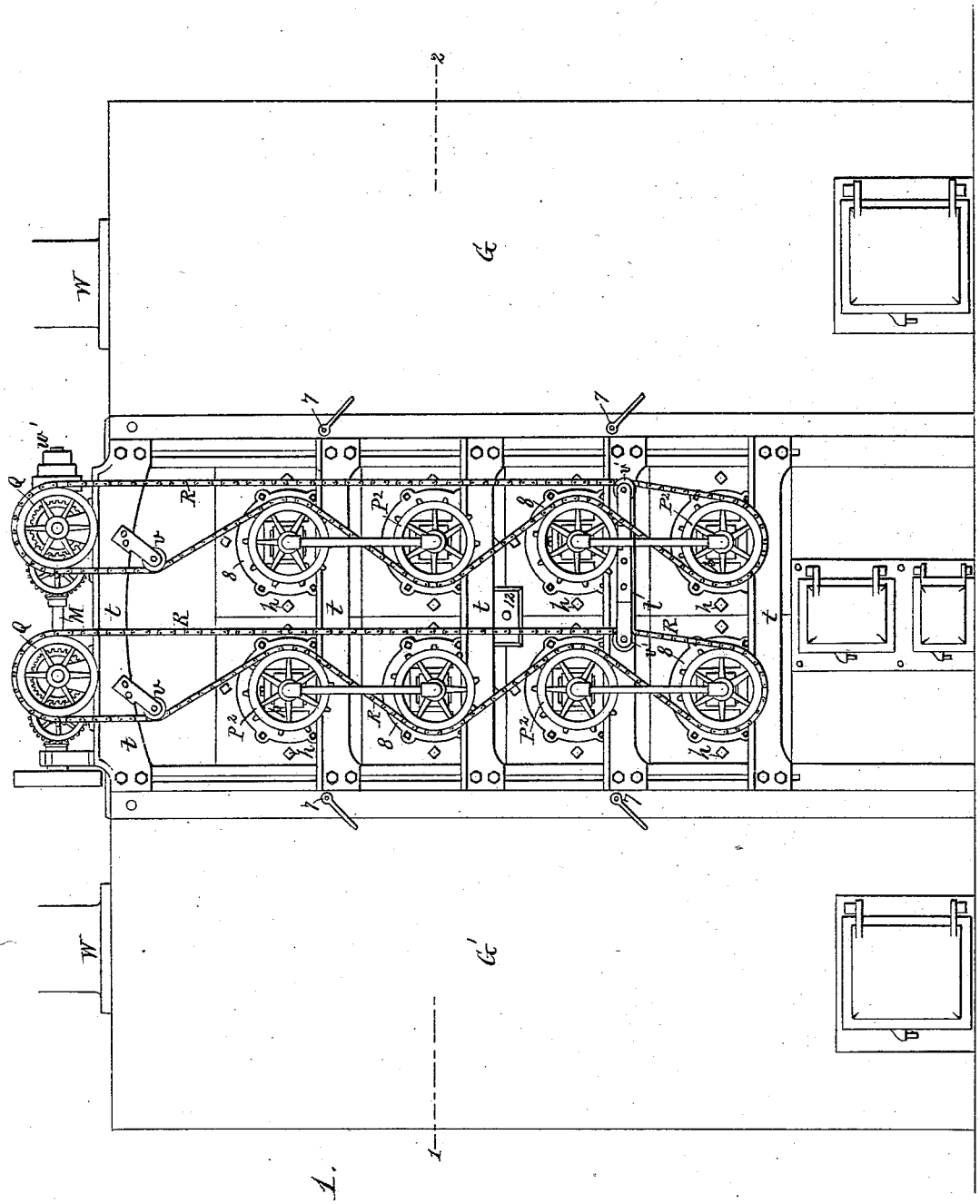
Figure 2:
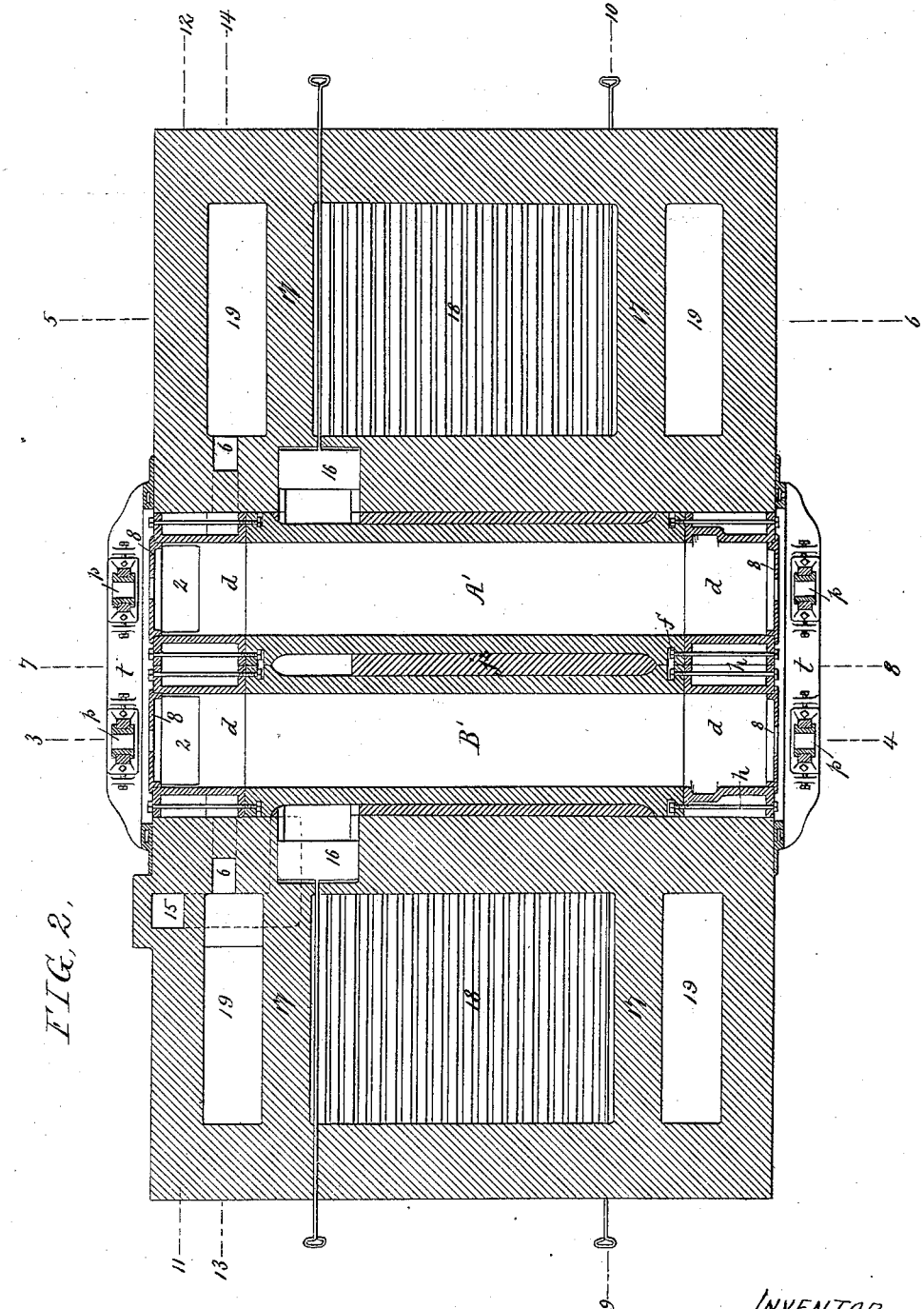
Figure 11:
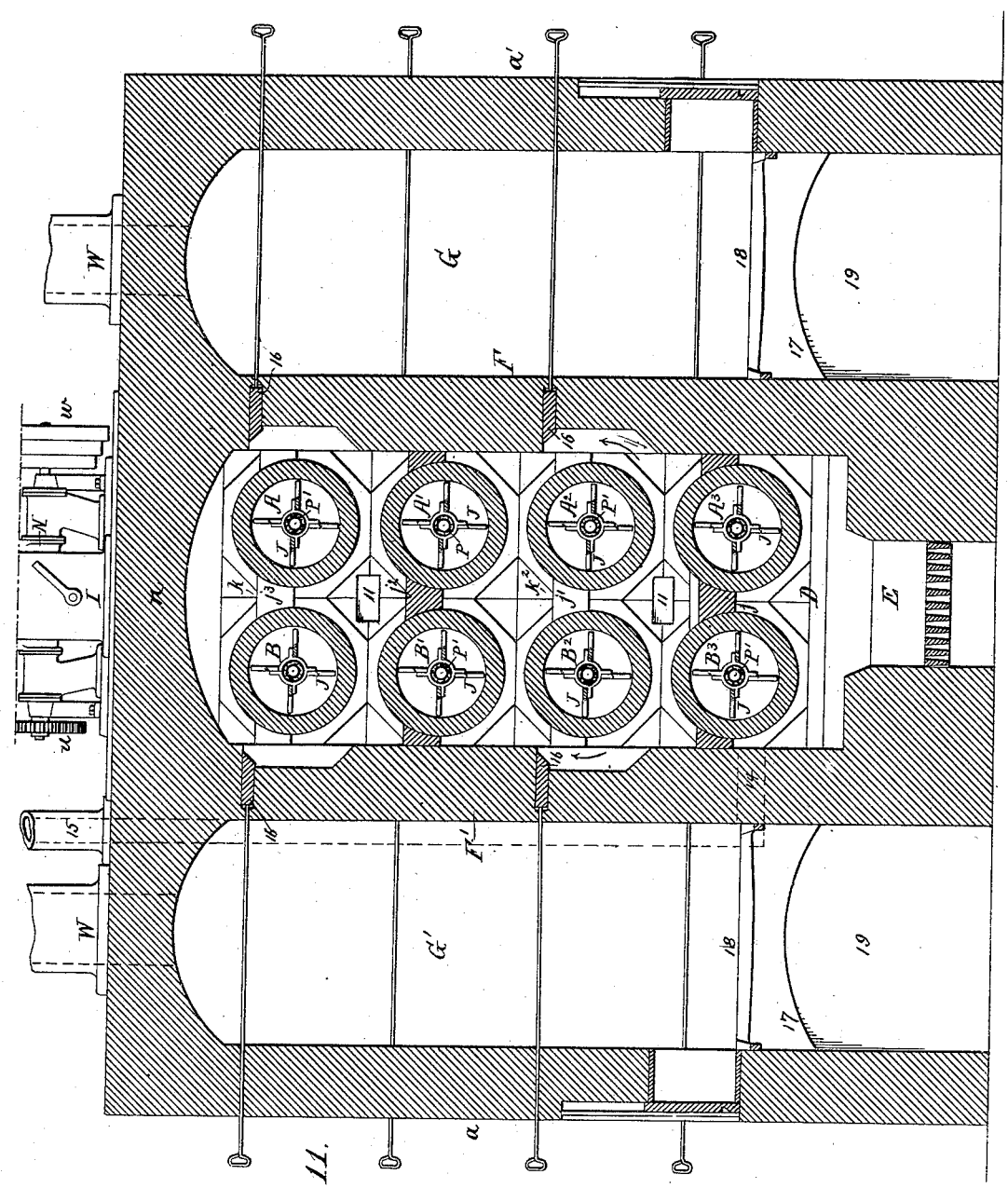
Figure 12:
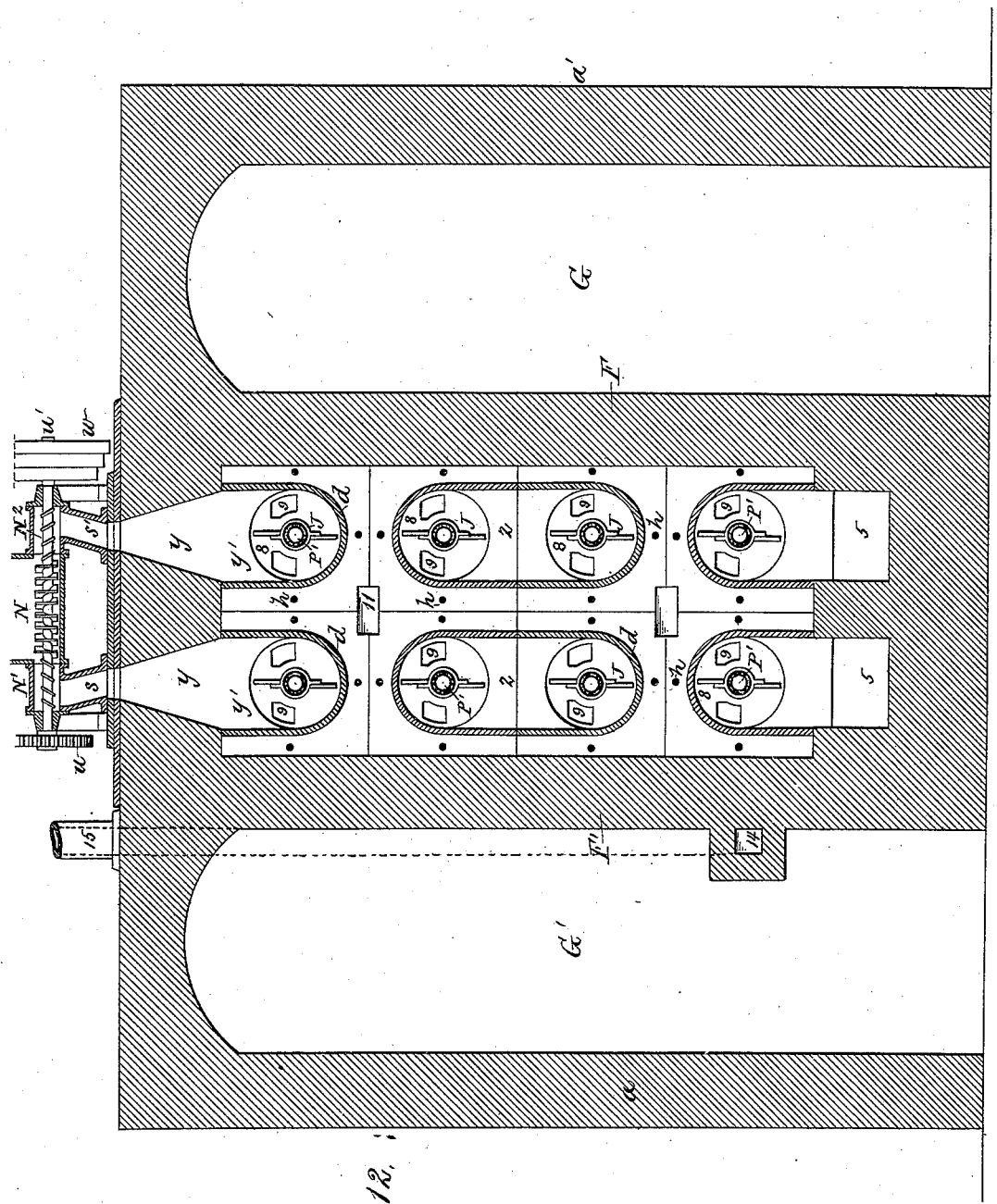

In the accompanying drawings, Figure 1, Sheet 1, is a front view of my improved ore-roasting furnace; Fig. 2, Sheet 2, a sectional plan on the line 1 2, Fig. 1; Fig. 3, Sheet 3, a vertical section on the line 3 4, Fig. 2; Fig. 4, a vertical section on the line 5 6, Fig. 2; Fig. 5, Sheet 4, a vertical section on the line 7 8, Fig. 2; Fig. 6, an enlarged view of part of the front of the furnace; Figs. 7 and 8, perspective views of the castings forming the ends of the retorts; Fig. 9, a perspective view of the end portion of one of the retorts; Fig. 10, a perspective view of one of the dampers; Fig. 11, Sheet 5, a vertical section of the furnace on the line 9 10, Fig. 2; Fig. 12, Sheet 6, a vertical section of the furnace on the line 11, 12, Fig. 2; and Fig. 13, Sheet 7, a vertical section on the line 13 14, Fig. 2.

In carrying out my invention I prefer to arrange the retorts in two sets or vertical rows, as described in the aforesaid patent, the retorts of one set being marked A, A', A², and A³, and those of the other set B, B', B², and B³, as shown in Fig. 11. I do not desire, however, to restrict myself either to the number of sets of retorts or to the number of retorts in each set. These retorts are contained in a combustion-chamber, D, which is in communication with a fire-place, E.

On one side of the combustion-chamber D, and separated therefrom by a wall, F, is a fume-chamber, G, and on the opposite side of the combustion-chamber, and separated therefrom by a wall, F', is a fume-chamber, G', a being the outer wall of the latter, and a' the outer wall of the chamber G. There are lateral communications, referred to hereinafter, between the series of retorts A, A', A², and A³ and the fume-chamber G, and lateral communications between the retorts B, B', B², and B³ and the fume-chamber G'. This is the case in the above-mentioned Patent No. 280,102, in which, however, the side chambers are termed "dust-chambers."

It will be seen hereinafter that air is permitted to enter the retorts at the ends of the same, instead of being forced into the retorts, as in other ore-roasting apparatus, and as the fumes from the retorts, together with the air, must pass laterally into the chambers G G', there must be a continuous draft through the retorts, and this must be caused either by exhaust apparatus connected with the said chambers G G', or by some such disposal of the air and fumes which enter these chambers as will cause a draft through the retorts. Each fume-chamber is provided with a chimney, W, Figs. 4 and 11, which may be of such altitude and capacity as to induce the desired draft. Exhausting mechanism the equivalent of the chimney may be used for the same purpose.

Referring to Figs. 2, 5, 6, 7, 8, and 9, it will be observed that each retort is composed of a main body, preferably of fire-clay, and a casting fitted and secured to each end of the body, and these castings are built up to form the front and rear walls of the combustion-chamber. A portion of one end of one of the retort bodies is shown in Fig. 9, the body being a plain unbroken cylinder of fire-clay, with a flange, *b*, at each end, this flange being preferably of octagonal form for reasons explained hereinafter.

Castings are secured one to each end of the body of each retort, one of these castings being shown in Fig. 7 and another in Fig. 8. As far as regards their duty of forming front and rear walls of the combustion-chamber of the furnace, all these castings are alike in being chambered to form passages in the walls, of which each casting forms a part; but, for reasons explained hereinafter, one set differs from another in detailed construction.

For the time being I will describe each of the castings H and H' as a short tube, *d*, provided with flanges *e e'*, the interior of the tube, when fitted to the end of the body of the retort, forming a continuation of the interior of the latter, as will be seen on referring to the sectional plan, Fig. 2. Nuts are let into recesses *f* in the flange *b* of the body of the retort, and bolts $h$, passing through the holes in the flanges $e\ e'$ of each casting screw into the nuts.

In erecting the structure, a suitable brick-work foundation is first made, and on this foundation are prepared beds, as shown at $i\ i'$ in Fig. 5, for the first four castings which form the ends of the two lowest retorts, and on these castings are built those appertaining to the second pair of retorts, and so on until all the retorts are in place, and the front and rear walls of the combustion-chamber formed by these castings are complete. The bodies of the retorts may be secured to the castings as the erection of the structure proceeds, during which, also, may be made the horizontal partitions $j, j', j^2$, and $j^3$. (Shown in Figs. 5 and 11.)

To prevent the possibility of any sagging of the bodies of the retort, the lower retort may be supported by fire-brick arches, one of which is indicated by dotted lines in Fig. 5, and similar arches may be interposed between the bodies of the other retorts. When the series of retorts, and their castings have been thus erected, the remaining portion of the structure, including the roof $n$, may be completed, and obviates difficulties which have been experienced in using roasting-furnaces in which the retorts were built directly into the brick walls of the furnace, the main difficulty being the want of permanence in both the walls and retorts, owing to variations in temperature and differences in the expansion and contraction of different parts. Each retort has a rotating rake, J, having inclined vanes or teeth, by which the ore admitted to the retort is traversed along the same. This rotating rake is too similar to that described in the aforesaid Patent No. 280,102 to need minute description here. It will suffice to remark that water is circulated through the tubular shafts P' of these rakes, which shafts are adapted to suitable bearings, $p$, on plates $t$, secured to the above-mentioned castings, which constitute the front and rear walls of the combustion-chamber. Each shaft P' is preferably provided with a protecting-coating to further prevent the destruction of the shaft by the influences to which it is subjected. The shaft P' of each rake is provided with a sprocket-wheel, P², Fig. 1, and for the shafts of the rakes of each set of retorts there is an endless driving-chain, R, which passes over a sprocket-wheel on a shaft, Q, adapted to bearings on the highest of the plates $t$, above referred to. The chain is properly guided by pulleys $v$ and $v'$, and partly surrounds the sprocket-wheel of each rotating rake. If there be but one set of retorts, the shaft Q may be driven directly by a belt or any available gearing; but as there are two sets of retorts and one set of rakes and one driving-chain for each set of retorts I prefer to use a driving-shaft, M, geared to the two shafts Q Q by any suitable system of wheels.

It is important that the ore should be traversed through the retorts in comparatively thin layers, so as to produce the best results. The pulverized ore is placed in a hopper, N, Fig. 12, and is at once brought under the influence of a rotating shaft, N², in a casing, N', the shaft having spiral ribs or vanes so inclined that one half of the ore introduced into the hopper is directed to the outlet $s$, and the other half to the outlet $s'$ of the said casing N', one stream of ore thus passing directly into one end of the highest of one set of retorts, and the other portion into the highest of the other set.

On the shaft N² is a cog-wheel, $u$, Fig. 3, into which gears a pinion on a driving-shaft, $u'$, and on the latter is a cone-pulley, $w$, for receiving a driving-belt from a similar cone-pulley, $w'$, on the driving-shaft M of the mechanism which rotates the rakes.

The passage $y$, for directing the ore from the feed mechanism to the highest retorts, Figs. 3 and 12, is made partly in one of the castings H' above mentioned; hence it will be necessary to refer back to Fig. 8, where will be observed the continuation $y'$ of the said passage $y$. The ore, after traversing the highest retort of each set, escapes to the next retort below through a passage, 2, Fig. 3, in which is a pivoted damper, 3, (shown in the detached view, Fig. 10,) and this passage is made partly in the casting H, Fig. 7, and partly in the casting below, which is similar to the casting H' above referred to. A similar damper, 3, is located in the passage $y$.

In referring to the traversing of a thin layer of ore through each retort, it should be understood that, owing to the action of the rakes, the ore enters the passage 2 in intermittent volumes as the rakes rotate slowly, one set of vanes pushing the ore into the passage before another volume is pushed into the same by another set of vanes. It is important, as will be seen hereinafter, that the passage 3 should be closed during the short interval between the admissions of the ore to the passage, hence the damper 3 is so pivoted that it will be self-opening to the ore, but self-closing in the absence of the ore. The damper is, however, provided with a small rod, 4, so that it can be operated by hand from the outside of the furnace should there be any obstruction to interfere with the automatic action of the said damper. Each of the passages for the ore from one retort to the other is furnished with a damper, and every passage is made in the castings which constitute the front and rear walls of the combustion-chamber. This is an important feature of my invention, for a passage bounded by cast-iron must necessarily be more permanent than one made in brick-work, which is sometimes the case in ore-roasting furnaces. It should be stated that the ore finally escapes from the lowest retort of each set through a passage, 5, Fig. 3. It has been ascertained that the best results have been attained by discharging the fumes from the retorts into the fume-chamber as speedily as possible. For this reason I have adopted the same system of lateral discharge-openings which are shown in the aforesaid Patent No. 280,102, each retort of each set having one outlet. Thus the uppermost retort of each set has a lateral outlet, 6, (shown in Fig. 13 and also in Fig. 4,) the outlet of each retort being near the point where the ore enters it, and each outlet is furnished with a damper, 7, which can be operated from the outside of the furnace.

To the casting of each retort is secured a cover, 8, in which are air-openings 9, Fig. 6, pivoted doors 10 being employed to close or expose the said openings.

The arrangement of the lateral outlets 6, valves 7, and air-openings in the ends of the retorts is the same as in the aforesaid patent, and for the purpose described therein.

The outlet-passages 6 are made partly in the castings which form the front and rear walls of the furnace, and partly in the walls which separate the combustion-chamber from the fume-chambers, the portions of the outlets which are in the castings being designated by the number 6, Figs. 7 and 8.

One of the objects of making the flanges $b$, Fig. 9, at the ends of the retorts octagonal is to afford an opportunity of examining the interior of the combustion-chamber through peep-holes 11, which are shown in Figs. 12 and 13, and which are made in the flanges of the castings, each peep-hole being furnished with a cover, 12. (Shown in Fig. 6.)

Sometimes the upper retorts of each set become too hot for the proper roasting of the ores, and should be permitted to cool. For this purpose I provide the passage $k^3$, Fig. 5, for the products of combustion, with a damper, 13, by the adjustment of which and of side dampers, 16, referred to hereinafter, the products of combustion are directed to a flue, 14, (shown by dotted lines in Fig. 5, and again shown in Figs. 2, 11, and 13,) this flue communicating with a supplementary chimney, 15, which may be furnished with a suitable damper.

A plan of diminishing the exposure of the upper and intermediate retorts to the heat of the products of combustion is shown in Figs. 2 and 11. There are sliding dampers 16 in the wall F of the combustion-chamber, and similar dampers in the other wall, F', and when one of these dampers has been pushed against a retort the products of combustion cannot pass on that side of the retort where the damper occurs.

When the fumes from the ore have to be utilized in the manufacture of sulphuric acid, I construct each fume-chamber in the manner shown in Figs. 2, 4, and 11. In each fume-chamber are two partition-walls, 17, which extend from the roof to about the distance from the bottom of the chamber shown in Fig. 4, and between these walls is a grating or perforated plate, 18, on which to place the usual niter-pots. The fumes from the ore first enter the passages 19 19, descend the latter, pass through the grating 18, and, uniting with the niter-fumes, pass off through the outlet W to the usual condensing-chamber of the sulphuric-acid apparatus. The spaces between the flanges $e$ $e'$ of the castings H H' are preferably filled in with fire-brick, except where the necessary passages occur, in order to prevent the products of combustion from gaining access to these spaces.

I claim as my invention—

1. The combination of one or more sets of retorts, those of each set being arranged one retort above the other, and the end portions of each retort being chambered, with a combustion-chamber the front and rear walls of which are composed of the said ends of the retorts, substantially as set forth.

2. The combination, in an ore-roasting furnace, of a series of retorts each of which has end castings forming part of the rear and front walls of the furnace, and a body of fire-clay attached to the castings, substantially as specified.

3. The combination of a series of retorts and their rotating rakes, communicating passages 2, and in each passage a damper, 3, self-opening under a weight of ore admitted to the passage and self-closing in the absence of ore, substantially as set forth.

4. The combination of the combustion-chamber and a series of retorts the opposite ends of which are castings forming the front and rear walls of the combustion-chamber, with communicating passages 2, made in the said castings, substantially as specified.

5. The combination of the combustion-chamber and one or more sets of retorts partly contained therein, with dampers 16, for restricting the passage of the products of combustion through the said chamber, substantially as set forth.

6. The combination of the combustion-chamber and a series of retorts partly contained therein, the passages $k^3$, and damper 13, with a flue, 14, substantially as described.

7. The combination of the combustion-chamber of an ore-roasting furnace, a series of retorts partly contained therein, the openings at the ends of the retorts, and the lateral outlets from the same, the fume-chamber in communication with the said outlets, the grated or perforated platform 18, and passages whereby the fumes from the retorts are caused to pass through the said grating to the outlet of the fume-chamber, all substantially as set forth.

In testimony whereof I have signed my name to this specification in the presence of two subscribing witnesses.

JOHN F. CARTER.

Witnesses:
HENRY HOWSON, Jr.,
HARRY SMITH.